(12) United States Patent
Shiba et al.

(10) Patent No.: US 7,868,103 B2
(45) Date of Patent: Jan. 11, 2011

(54) METHOD FOR PRODUCING POLYBUTADIENE

(75) Inventors: Koji Shiba, Ichihara (JP); Michinori Suzuki, Ichihara (JP); Masato Murakami, Ichihara (JP); Yuji Matsudaira, Ichihara (JP)

(73) Assignee: Ube Industries, Ltd., Ube-shi (JP)

( * ) Notice: Subject to any disclaimer, the term of this patent is extended or adjusted under 35 U.S.C. 154(b) by 20 days.

(21) Appl. No.: 12/227,521

(22) PCT Filed: May 17, 2007

(86) PCT No.: PCT/JP2007/060122

§ 371 (c)(1), (2), (4) Date: Feb. 11, 2009

(87) PCT Pub. No.: WO2007/135946

PCT Pub. Date: Nov. 29, 2007

(65) Prior Publication Data

US 2009/0143548 A1    Jun. 4, 2009

(30) Foreign Application Priority Data

| May 22, 2006 | (JP) | ............................. 2006-141109 |
| Jun. 15, 2006 | (JP) | ............................. 2006-166617 |
| Jul. 20, 2006 | (JP) | ............................. 2006-197862 |

(51) Int. Cl.
  *C08F 2/38*     (2006.01)
  *C08F 136/06*   (2006.01)

(52) U.S. Cl. ............................. 526/84; 526/94; 526/136; 526/164; 528/488; 528/490

(58) Field of Classification Search .................. 526/94, 526/84, 136, 164; 528/488, 490
See application file for complete search history.

(56) References Cited

U.S. PATENT DOCUMENTS

| 4,472,559 A   | 9/1984  | Maehara et al. |
| 4,476,287 A   | 10/1984 | Maehara et al. |
| 4,501,867 A * | 2/1985  | Ueno et al. .................. 526/136 |
| 5,567,784 A   | 10/1996 | Wieder et al. |
| 5,677,400 A * | 10/1997 | Tsujimoto et al. ............. 526/94 |
| 6,956,093 B1  | 10/2005 | Hsu et al. |
| 2009/0105401 A1 * | 4/2009 | Suzuki et al. ............... 524/526 |

FOREIGN PATENT DOCUMENTS

| DE | 4436059 A1 | 4/1996 |
| EP | 1816145 | 8/2007 |
| GB | 1372399 | 10/1974 |
| JP | 49-17666 | 5/1974 |
| JP | 49-17667 | 5/1974 |
| JP | 54-30280 | 3/1979 |
| JP | 54-50088 | 4/1979 |
| JP | 62-171 | 6/1983 |
| JP | 63-36324 | 6/1983 |
| JP | 2-37927 | 1/1984 |
| JP | 59-15413 | 1/1984 |
| JP | 59-30839 | 2/1984 |
| JP | 3-63566 | 4/1984 |
| JP | 2-38081 | 9/1984 |
| JP | 61-23611 | 2/1986 |
| JP | 4-48815 | 4/1986 |
| JP | 2000-44633 | 2/2000 |
| JP | 2000-154215 | 6/2000 |
| JP | 2000-159836 | 6/2000 |
| JP | 2000-256507 | 9/2000 |
| JP | 2001-294614 | 10/2001 |
| JP | 2006-124706 | 5/2006 |
| WO | WO-2006/049016 | 5/2006 |

OTHER PUBLICATIONS

Abstract of AN: 1979: 421740, Database CAPLUS, 4 pages.*
International Search Report mailed Jul. 17, 2007, issued on PCT/JP2007/060122.
Abstract of AN 1979-28920B Database WPI Week 197915, Thomson Scientific, 1979, 1 page.
Supplemental European Search Report dated Sep. 24, 2009, issued on the corresponding European patent application No. 07 74 3557.6.

* cited by examiner

*Primary Examiner*—Fred M Teskin
(74) *Attorney, Agent, or Firm*—Edwards Angell Palmer & Dodge LLP

(57) ABSTRACT

A method for producing a polybutadiene, which comprises subjecting 1,3-butadiene to cis-1,4 polymerization, and subsequently subjecting a resultant in the resulting polymerization system to syndiotactic-1,2 polymerization, the method being characterized in that there is added, after the polymerization, a halogen acid or halogen acid salt.

11 Claims, No Drawings

METHOD FOR PRODUCING POLYBUTADIENE

TECHNICAL FIELD

The present invention relates to a method for producing a reinforced polybutadiene of reduced odor (hereinafter abbreviated as VCR) comprising a cis-1,4 polymer and a syndiotactic-1,2 polymer, by polymerizing 1,3-butadiene.

BACKGROUND ART

As the method for production of VCR, there is known, in JP-B-1974-17666 (patent Literature 1) and JP-B-1974-17667 (Patent Literature 2), a method which comprises subjecting 1,3-butadiene to cis-1,4 polymerization in an inert organic solvent using a catalyst obtained from water, a soluble cobalt compound and an organic aluminum chloride represented by the general formula $AlR_nX_{3-n}$ and then, in the polymerization system, subjecting 1,3-butadiene to syndiotactic-1,2 polymerization in the presence of a syndiotactic-1,2 polymerization catalyst obtained from a soluble cobalt compound, an organic aluminum compound represented by the general formula $AlR_3$ and carbon disulfide.

Also, as the method for production of VCR, there is described, in JP-B-1987-171 (Patent Literature 3), JP-B-1988-36324 (Patent Literature 4), JP-B-1990-37927 (Patent Literature 5), JP-B-1990-38081 (Patent Literature 6) and JP-B-1991-63566 (Patent Literature 7), for example, a method which comprises subjecting 1,3-butadiene to cis-1,4 polymerization in the presence or absence of carbon disulfide to produce a VCR, or, after production of the VCR, separating 1,3-butadiene from carbon disulfide for recovery and circulating 1,3-butadiene containing substantially no carbon disulfide and an inert organic solvent. Further, in JP-B-1992-48815 (Patent Literature 8), there is described a VCR which is small in die swell ratio when made into a compound and, when the compound has been vulcanized, is excellent in tensile stress and flex-cracking resistance and is suitable as a side wall of tire.

In JP-A-2000-44633 (Patent Literature 9), there is provided a method for producing a novel VCR, which comprises subjecting 1,3-butadiene to cis-1,4 polymerization in an inert organic solvent composed mainly of a C4 fraction, using a catalyst system comprising a halogen-containing organic aluminum compound, a soluble cobalt compound and water and, in the resulting polymerization reaction mixture, subjecting 1,3-butadiene to syndiotactic-1,2 polymerization in the presence of a syndiotactic-1,2 polymerization catalyst obtained from a soluble cobalt compound, a trialkyl aluminum compound and carbon disulfide. It is further disclosed that the VCR obtained is a VCR composition comprising 3 to 30% by weight of a boiling n-hexane-insoluble matter, which is a syndiotactic-1,2-polybutadiene having a form of dispersed short fiber crystals, and 97 to 70% by weight of a boiling n-hexane-soluble matter, which has a cis structure containing 90% or more of a cis-1,4-polybutadiene.

In JP-A-2000-154215 (Patent Literature 10) and JP-A-2000-159836 (Patent Literature 11), there is provided a method for producing a novel VCR, which comprises subjecting 1,3-butadiene to cis-1,4 polymerization using a catalyst obtained from (A) a metallocene type complex of a transition metal compound and (B) an ionic compound between non-coordinating anion and cation and/or an aluminoxane and, in the resulting polymerization reaction mixture, subjecting 1,3-butadiene to syndiotactic-1,2 polymerization in the presence of a catalyst obtained from at least one compound selected from (E) a cobalt compound, (F) an isocyanic acid compound and carbon disulfide.

In the syndiotactic-1,2 polymerization of 1,3-butadiene, however, there are cases that offensive odor derived from the sulfur compound used is generated depending upon the polymerization conditions employed, and improvement has been desired.

In U.S. Pat. No. 6,956,093 (Patent Literature 12), there is disclosed a method for producing a rubber composition of reduced odor, which comprises treating, with hydrogen peroxide, a syndiotactic-1,2-polybutadiene obtained by using a catalyst containing carbon disulfide as a catalyst component. However, the method is not preferred because the hydrogen peroxide may oxidize the double bond of the polybutadiene or the remaining butadiene monomer.

Patent Literature 1: JP-B-1974-17666
Patent Literature 2: JP-B-1974-17667
Patent Literature 3: JP-B-1987-171
Patent Literature 4: JP-B-1988-36324
Patent Literature 5: JP-B-1990-37927
Patent Literature 6: JP-B-1990-38081
Patent Literature 7: JP-B-1991-63566
Patent Literature 8: JP-B-1992-48815
Patent Literature 9: JP-A-2000-44633
Patent Literature 10: JP-A-2000-154215
Patent Literature 11: JP-B-2000-159836
Patent Literature 12: U.S. Pat. No. 6,956,093

DISCLOSURE OF THE INVENTION

The task to be achieved by the present invention is to provide a method for producing a reinforced polybutadiene of reduced odor (hereinafter, often abbreviated as VCR) comprising a cis-1,4 polymer and a syndiotactic-1,2 polymer, by polymerizing 1,3-butadiene.

The present invention relates to a method for producing a polybutadiene of reduced odor, which comprises subjecting 1,3-butadiene to cis-1,4 polymerization, and subsequently subjecting a resultant in the resulting polymerization system to syndiotactic-1,2 polymerization, the method being characterized in that there is added, after the polymerization, a halogen acid or a halogen acid salt, both represented by the following general formula (I):

$$M'(X'O_q)_rZ'_s \qquad (I)$$

(wherein M' is a metal atom or a hydrogen atom; X' is a halogen atom selected from chlorine, bromine and iodine; O is an oxygen atom; q is an integer of 1 to 4; Z' is an anion capable of bonding to M'; r is an integer of 1 or more; and r+s is the oxidation number of M').

In the present invention, the X' of the compound represented by the general formula (I) is preferably chlorine.

In the present invention, the compound represented by the general formula (I) is preferably hypochlorous acid or a hypochlorous acid salt.

The present invention can be used as a method for producing a reinforced polybutadiene rubber of reduced odor by using a polybutadiene produced by the following method. That is, firstly, a reinforced polybutadiene rubber of reduced odor can be produced by using a polybutadiene produced by using, as a catalyst for cis-1,4 polymerization, a catalyst comprising a cobalt compound, an organic aluminum compound and water. Secondly, a reinforced polybutadiene rubber of reduced odor can be produced by using a polybutadiene obtained by subjecting 1,3-butadiene to cis-1,4 polymerization using a catalyst obtained from a metallocene type complex of a transition metal compound, and an ionic compound between non-coordinating anion and cation and/or an aluminoxane. Thirdly, a reinforced polybutadiene rubber of reduced odor can be produced by using a polybutadiene obtained by using, as a catalyst for cis-1,4 polymerization, a catalyst obtained from (A) an yttrium compound, (B) an ionic compound between non-coordinating anion and cation, and (C) an organic metal compound of an element selected from group 2, group 12 and group 13 of periodic table.

In the method according to the present invention, firstly, when there is used a polybutadiene produced by using, as a catalyst for cis-1,4 polymerization, a catalyst comprising a cobalt compound, an organic aluminum compound and water, the organic aluminum compound is preferably a trialkyl aluminum compound represented by $R^1{}_3Al$ (wherein $R^1$ is a hydrocarbon group having 1 to 10 carbon atoms) and a halogen-containing aluminum compound represented by $R^2{}_{3-n}AlX_n$ (wherein $R^2$ is a hydrocarbon group having 1 to 10 carbon atoms, X is halogen, and n is a number of 1 to 2).

It is also preferable that the catalyst for cis-1,4 polymerization is a catalyst obtained by subjecting, to aging, components selected from a compound of a group 3 metal of periodic table, an alkyl aluminum hydride compound, butadiene, methyl aluminoxane and a chlorine-containing compound.

Secondly, it is also preferable that the catalyst for cis-1,4 polymerization is a catalyst obtained from a metallocene type complex of a transition metal compound, an ionic compound between non-coordinating anion and cation, an organic metal compound of a group 1 to 3 element of periodic table and water [(organic metal compound of group 1 to 3 element of periodic table)/(water)=0.66 to 5 (molar ratio)].

When there is used a catalyst containing an yttrium compound, an yttrium compound having a bulky ligand, represented by the following general formula:

[formula 1]

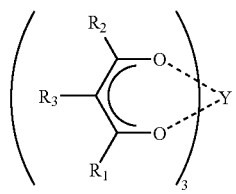

(wherein $R^1$, $R^2$ and $R^3$ are each hydrogen or a hydrocarbon group having 1 to 12 carbon atoms, O is an oxygen atom, and Y is an yttrium atom)

may be used preferably.

Incidentally, the catalyst for the syndiotsactic-1,2 polymerization is preferably a cobalt compound, an alkyl aluminum compound and a sulfur compound.

The present invention also relates to a method for producing a reinforced polybutadiene of reduced odor, wherein the polybutadiene is a reinforced polybutadiene comprising (1) 3 to 30% by weight of a boiling n-hexane-insoluble matter and (2) 97 to 70% by weight of a boiling n-hexane-soluble matter.

The present invention provides a method for producing a reinforced polybutadiene rubber of reduced odor, comprising a cis-1,4 polymer and a syndiotactic-1,2 polymer, by adding a halogen acid or a halogen acid salt after 1,3-butadine polymerization.

BEST MODE FOR CARRYING OUT THE INVENTION

The present invention method for producing a polybutadiene, which comprises subjecting 1,3-butadiene to cis-1,4 polymerization, and subsequently subjecting a resultant in the resulting polymerization system to syndiotactic-1,2 polymerization, the substance added, after the polymerization, for odor reduction is a halogen acid or a halogen acid salt, both represented by the following general formula (I):

$$M'(X'O_q)_r Z'_s \qquad (I)$$

(wherein M' is a metal atom or a hydrogen atom; $X_1$ is a halogen atom selected from chlorine, bromine and iodine; O is an oxygen atom; q is an integer of 1 to 4; Z' is an anion capable of bonding to M'; r is an integer of 1 or more; and r+s is the oxidation number of M'). As M', there can be mentioned, hydrogen, lithium, sodium, potassium, magnesium, calcium, strontium, barium, yttrium, vanadium, iron, cobalt, nickel, copper, zinc, boron, aluminum, etc. M' is preferably hydrogen, lithium, sodium, potassium, magnesium, calcium or aluminum; is particularly preferably hydrogen, sodium, potassium, magnesium or calcium; and is further preferably sodium or calcium.

As X', there can be mentioned chlorine, bromine and iodine. Of these, chlorine is preferred.

q is an integer of 1 to 4, preferably 1 or 2, particularly preferably 1.

Z' is an anion other than halogen acid ion and has no particular restriction as long as it can bond so as to neutralize the positive charge of M' remaining without being sufficiently neutralized with the halogen acid ion. There can be mentioned, for example, halogen ion such as chlorine, bromine, iodine or the like; hydroxide ion; oxide ion; nitrous acid ion; nitric acid ion; sulfuric acid ion; phosphorous acid ion; phosphoric acid ion; boric acid ion; carboxylic acid ion; and alkoxy ion. Of these, particularly preferred are chlorine ion and hydroxide ion.

r is the number of halogen acid ion bonding to M' and is a positive sum not exceeding the oxidation number of M'. s the number of Z bonding to M'. Therefore, r+s is the oxidation number of M'.

As specific examples of the halogen acid or the halogen acid salt, there can be mentioned hypochlorous acid, chlorous acid, chrolic acid, perchloric acid, hypobromous acid, bromous acid, bromic acid, perbromic acid, hypoiodous acid, iodous acid, iodic acid, periodic acid, lithium hypochlorite, sodium hyprochlorite, magnesium hypochlorite, calcium hypochlorite, calcium hypochlorite chloride, and calcium hypochlorite hydroxide. Preferred are sodium hypochlorite, calcium hypochlorite, calcium hypochlorite chloride, and calcium hypochlorite hydroxide, and particularly preferred is sodium hypochlorite.

As the solvent used in the polybutadiene production of the present invention, there can be mentioned hydrocarbon solvents such as straight chain aliphatic hydrocarbon such as n-hexane, butane, heptane or pentane; cyclic aliphatic hydrocarbon such as cyclopentane or cyclohexane; C4 fraction olefinic hydrocarbon such as 1-butene, cis-2-butene or trans-2-butene; mineral spirit, solvent naphtha, kerosene and the like; halogenated hydrocarbon solvents such as methylene chloride and the like; and so forth. They can be used singly or in admixture. Of them, a cyclohexane-containing solvent is used preferably. A mixture between cyclohexane and C4 fraction (e.g. cis-2-butene or trans-2-butene) is used particularly preferably.

As the first catalyst for cis-1,4 polymerization, there can be used a catalyst comprising a cobalt compound, an organic aluminum compound and water. As the organic aluminum compound, there can be used a mixture of a trialkyl aluminum compound represented by $R^1{}_3Al$ (wherein $R^1$ is a hydrocarbon group having 1 to 10 carbon atoms) and a halogen-containing aluminum compound represented by $R^2_{3-n}AlX_n$ (wherein $R^2$ is a hydrocarbon group having 1 to 10 carbon atoms, X is halogen, and n is a number of 1 to 2).

As the cobalt compound in the catalyst for cis-1,4 polymerization, a salt or a complex of cobalt is used preferably. As particularly preferred cobalt compounds, there can be mentioned cobalt salts such as cobalt chloride, cobalt bromide, cobalt nitrate, cobalt octylate, cobalt naphthenate, cobalt acetate, cobalt malonate and the like; cobalt bisacetylacetonate and trisacetylacetonate; cobalt ethyl acetoacetate; cobalt halide-triarylphosphine complex, its trialkylphosphine complex, its organic base complex such as its pyridine complex or its picoline complex, or its ethyl alcohol complex; etc.

As the trialkyl aluminum compound represented by $R^1_3Al$ (wherein $R^1$ is a hydrocarbon group having 1 to 10 carbon atoms, preferably 2 to 8 carbon atoms), there can be mentioned triethyl aluminum, trimethyl aluminum, triisobutyl aluminum, trihexyl aluminum, trioctyl aluminum, etc. Of these, triethyl aluminum is preferred.

As the halogen-containing aluminum compound represented by $R^2_{3-n}AlX_n$ (wherein $R^2$ is a hydrocarbon group having 1 to 10 carbon atoms, preferably 2 to 8 carbon atoms, X is halogen, and n is a number of 1 to 2), there can be mentioned dialkyl aluminum halides such as dialkyl aluminum chloride, dialkyl aluminum bromide and the like; alkyl aluminum sesquihalides such as alkyl aluminum sesquichloride, alkyl aluminum sesquibromide and the like; alkyl aluminum dihalides such as alkyl aluminum dichloride, alkyl aluminum dibromide and the like; etc. As specific compounds, there can be mentioned diethyl aluminum monochloride, diethyl aluminum monobromide, dibutyl aluminum monochloride, ethyl aluminum sesquichloride, ethyl aluminum dichloride, dicyclohexyl aluminum monochloride, diphenyl aluminum monochloride, etc. Of these, diethyl aluminum monochloride is preferred.

The amount of the cobalt compound used is ordinarily $1 \times 10^{-7}$ to $1 \times 10^{-4}$ mol, preferably $1 \times 10^{-6}$ to $1 \times 10^{-5}$ mol relative to 1 mol of the butadiene used.

The amount of the trialkyl aluminum used is ordinarily 10 to 5,000 mols, preferably 50 to 1,000 mols relative to 1 mol of the cobalt compound used.

The amount of the halogen-containing aluminum compound used is 0 to 1, preferably 0.1 to 0.9, particularly preferably 0.25 to 0.75 in terms of the ratio (X/Al) of the X atom in the halogen-containing aluminum compound and the Al atom in the trialkyl aluminum and the halogen-containing aluminum.

The amount of the water used is 0.1 to 1.45 mols, preferably 0.2 to 1.2 mols relative to 1 mol of the aluminum compound.

As to the addition order of the catalyst components, there is no particular restriction. However, it is preferred that the trialkyl aluminum and the halogen-containing aluminum are mixed and aged in an inert solvent and then used. The aging time is preferably 0.1 to 24 hours, and the aging temperature is preferably 0 to 80° C.

It is preferred that water is added to the mixture after aging, followed by further aging. The aging time is preferably 0.1 to 24 hours, and the aging temperature is preferably 0 to 80° C.

As the catalyst for cis-1,4 polymerization, there may also be used a catalyst obtained by subjecting, to aging, components selected from a compound of a group 3 metal of periodic table, an alkyl aluminum halide compound, butadiene, methyl aluminoxane and a chlorine-containing compound.

The metal constituting the compound of a group 3 metal of periodic table which is a component of the above catalyst system, is an atom belonging to the group 3 of periodic table, and includes elements of lanthanum series, elements of actinium series, etc. A rare earth metal is preferred. Specifically, there is mentioned neodymium, praseodymium, cerium, lanthanum, gadolinium, or a mixture thereof. Neodymium is preferred particularly.

As the compound of a group 3 metal of periodic table, there can be mentioned a carboxylate of a group 3 metal of periodic table, its alkoxide, its β-diketone complex, its phosphate or its phosphite, etc. Of these, a carboxylate and a phosphate are preferred, and a carboxylate is preferred particularly.

The carboxylate of a group 3 metal of periodic table is a compound represented by the general formula $(RCO_2)_3M$ (wherein M is a group 3 metal of periodic table, and R is a hydrocarbon group of 1 to 20 carbon atoms).

The R is a saturated or unsaturated alkyl group which is straight chain, branched chain or cyclic. The carboxyl group $CO_2$ bonds to a primary, secondary or tertiary carbon atom. Specifically, there can be mentioned salts of octanoic acid, 2-ethyl-hexanoic acid, oleic acid, stearic acid, benzoic acid, naphthenic acid, Versatic Acid (trade name of Shell Chemical; a carboxylic acid in which carboxyl group bonds to a tertiary carbon), etc. Of these, 2-ethyl-hexanoic acid and Versatic Acid are preferred.

The alkoxide of a group 3 metal of periodic table is a compound represented by the general formula $(RO)_3M$ (wherein M and R have the same definitions as give above). As examples of the alkoxy group represented by RO, there can be mentioned 2-ethyl-hexyloxy group, oleyloxy group, stearyloxy group, phenoxy group and benzyloxy group. Of these, 2-ethyl-hexyloxy group and benzyloxy group are preferred.

As the β-diketone complex of a group 3 metal of periodic table, there can be mentioned, for example, a complex of a group 3 metal of periodic table with acetylacetone, benzoylacetone, propionitrileacetone, valerylacetone, or ethyl acetoacetone. Of these, acetylacetone complex and ethyl acetoacetone complex are preferred.

As the phosphate or phosphite of a group 3 metal of periodic table, there can be mentioned bis(2-ethylhexyl)phosphate of a group 3 metal of periodic table, its bis(1-methylheptyl)phosphate, its bis(p-nonylphenyl)phosphate, bis (polyethylene glycol-p-nonylphenyl)phosphate, its (1-methylheptyl) (2-ethylhexyl)phosphate, its (2-ethylhexyl) (p-nonylphenyl)phosphate, its mono-2-ethylhexyl 2-ethylhexyl phosphonate, its mono-2-nonylphenyl 2-ethylhexyl phosphonate, its bis(2-ethylhexyl) phosphinate, its bis(1-methylheptyl) phosphinate, its bis(p-nonylphenyl) phosphinate, its (1-methylheptyl) (2-ethylhexyl) phosphinate, its (2-ethylhexyl) (p-nonylphenyl)phosphinate, etc. Of these, preferred are bis(2-ethylhexyl)phosphate of a group 3 metal of periodic table, its bis(1-methylheptyl)phosphate, its mono-2-ethylhexyl 2-ethylhexyl phosphonate, its bis(2-ethylhexyl) phosphinate,etc.

Of the above-shown compounds, particularly preferred is a phosphate of neodymium or a carboxylate of neodymium, and most preferred are carboxylic acid salts, for example, 2-ethyl hexanoic acid salt of neodymium and Versatic Acid salt of neodymium.

As the alkyl aluminum hydride compound of the above catalyst system, there can be mentioned diethyl aluminum hydride, dipropyl aluminum hydride, di-n-butylethyl aluminum hydride, diisobutyl aluminum hydride, diphenyl aluminum hydride, etc.

As the chlorine-containing compound of the above catalyst system, an alkyl aluminum chloride can be mentioned. Particularly, there can be mentioned a dialkyl aluminum halide such as dialkyl aluminum chloride, dialkyl aluminum bromide or the like; an alkyl aluminum sesquihalide such as alkyl aluminum sesquichloride, alkyl aluminum sesquibromide or the like; an alkyl aluminum dihalide such as alkyl aluminum dichloride, alkyl aluminum dibromide or the like; etc. As specific compounds, there can be mentioned diethyl aluminum monochloride, diethyl aluminum monobromide, dibutyl aluminum monochloride, ethyl aluminum sesquichloride, ethyl aluminum dichloride, dichlorohexyl aluminum monochloride, diphenyl aluminum monochloride, etc.

The proportions of the individual components of the above catalyst system are preferably as follows. (Alkyl aluminum hydride compound): (compound of group 3 metal of periodic table)=1:1 to 100:1 (molar ratio) (Butadiene): (compound of group 3 metal of periodic table)=0.5:1 to 200:1 (molar ratio) (Methyl aluminoxane): (compound of group 3 metal of periodic table)=1:1 to 1000:1 (molar ratio) (Chlorine-containing compound): (compound of group 3 metal of periodic table)=1:1 to 10:1 (molar ratio)

The above catalyst system is preferably used after being subjected to aging. The aging time is preferably 1 minute to 150 minutes. The aging temperature is preferably $-10°$ C. to $60°$ C.

As the second catalyst for cis-1,4 polymerization, there can be used a catalyst obtained from (a) a metallocene type complex of a transition metal compound, and (b) an ionic compound between non-coordinating anion and cation and/or an aluminoxane, or a catalyst obtained from (a) a metallocene type complex of a transition metal compound, (b) an ionic compound between non-coordinating anion and cation, (c) an organic metal compound of a group 1 to 3 element of periodic table, and (d) water [(c)/(d)=0.65 to 5 (molar ratio)].

As the metallocene type complex of a transition metal compound, which is a component (a), a metallocene type complex of a compound of a group 4 to 8 transition metal of periodic table can be mentioned.

There can be mentioned, for example, a metallocene type complex (e.g. $CpTiCl_3$) of periodic table group 4 transition metal such as titanium or zirconium; a metallocene type complex of periodic table group 5 transition metal such as vanadium, niobium or tantalum; a metallocene type complex of periodic table group 6 transition metal such as chromium; and a metallocene type complex of periodic table group 8 transition metal such as cobalt or nickel.

Of them, a metallocene type complex of periodic table group 5 transition metal is used preferably.

As the metallocene type complex of periodic table group 5 transition metal, there can be mentioned compounds represented by the following general formulas:

RM.La (1)

RnMX2-n.La (2)

RnMX3-n.La (3)

RMX3.La (4)

RM(O)X2.La (5)

RnMX3-n(NR') (6)

(wherein n 1 or 2 and a is 0, 1 or 2).

Of them, RM.La, RMX3.La, RM(O)X2.La, etc. can be mentioned preferably.

M is preferably a compound of a periodic table group 5 transition metal. M is specifically vanadium (V), niobium (Nb) or tantalum (Ta) with vanadium being preferred.

R is cyclopentadienyl group, substituted cyclopentadienyl group, indenyl group, substituted indenyl group, fluorenyl group or substituted fluorenyl group.

As the substituent in the substituted cyclopentadienyl group, the substituted indenyl group, or the substituted fluorenyl group, there can be mentioned, for example, straight chain or branched chain aliphatic hydrocarbon groups such as methyl, ethyl, propyl, isopropyl, n-butyl, isobutyl, sec-butyl, tert-butyl, hexyl and the like; aromatic hydrocarbon groups such as phenyl, tolyl, naphthyl, benzyl and the like; and silicon atom-containing hydrocarbon groups such as trimethylsilyl and the like. There are further included those groups in which cyclopentadienyl ring is bonded to part of X via a crosslinking group such as dimethylsilyl, dimethylmethylene, methylphenylmethylene, diphenylmethylene, ethylene, substituted ethylene or the like.

As specific examples of the substituted cyclopentadienyl group, there can be mentioned methylcyclopentadienyl group, 1,2-dimethylcyclopentadienyl group, 1,3-dimethylcyclopentadienyl group, 1,3-di(tert-butyl)cyclopentadienyl group, and 1,2,3-trimethylcyclopentadienyl group.

X is hydrogen, halogen, hydrocarbon group having 1 to 20 carbon atoms, alkoxy group or amino group. All X's may be the same or different from each other.

As X, preferred are hydrogen, fluorine atom, chlorine atom, bromine atom, methyl, ethyl, butyl, methoxy, ethoxy, dimethylamino, diethylamino, etc.

L is a Lewis base and is an ordinary inorganic or organic compound of Lewis base type which can be coordinated to a metal. A compound having no active hydrogen is preferred particularly. As specific examples, there can be mentioned ether, ester, ketone, amine, phosphine, silyloxy compound, olefin, diene, aromatic compound and alkyne.

NR' is imide group. R' is a hydrocarbon group having 1 to 25 carbon atoms.

As the component (a), i.e. the metallocene type complex of a periodic table group 5 transition metal compound, there is preferred one in which M is vanadium, i.e. a vanadium compound. There are preferred, for example, RV.La, RVX.La, R2V.La, RVX2.La, R2VX.La, RVX3.La, and RV(O)X2.La. RV.La and RVX3.La are preferred particularly.

As RM.La, i.e. the compound of a periodic table group 5 transition metal of +1 oxidation number, having one cycloalkadienyl group as the ligand, there can be mentioned cyclopentadienyl(benzene)vanadium, cyclopentadienyl(toluene)vanadium, cyclopentadienyl(xylene)vanadium, cyclopentadienyl(trimethylbenzene)vanadium, cyclopentadienyl(hexamethylbenzene)vanadium, cyclopentadienyl(ferrocene)vanadium, methylcyclopentadienyl (benzene) vanadium, etc.

The compound represented by RnMX2-n.La, when n is 1, that is, the compound has one cycloalkadienyl group as the ligand, the compound can have, as other, σ-bond-formable ligand, hydrogen; halogen atom such as chlorine, bromine, iodine or the like; hydrocarbon group such as methyl group, phenyl group, benzyl group, neopentyl group, trimethylsilyl group, bistrimethylsilylmethyl group or the like; hydrocarbon oxy group such as methoxy group, ethoxy group, isopropoxy group or the like; and hydrocarbon amino group such as dimethylamino group, diethylamino group, diisopropylamino group, dioctylamino group or the like.

The compound may further have, as other ligand, a neutral Lewis base such as amine, amide, phosphine, ether, ketone, ester, olefin, diene, aromatic hydrocarbon, alkyne or the like. A Lewis base having no active hydrogen is preferred.

The compound represented by RnX2-n.La, when n is 2, that is, the compound has two cycloalkadienyl groups as the ligand, the compound includes those compounds in which the two cycloalkadienyl rings are bonded to each other via a crosslinking group such as Me2Si group, dimethylethylene group, methylphenylmethylene group, diphenylmethylene group, ethylene group, substituted ethylene group or the like.

As specific examples of the compound represented by RnMX2-n.La in which n=1, that is, the compound of a periodic table group 5 transition metal of +2 oxidation number, having one cycloalkadienyl group as the ligand, there can be mentioned chlorocyclopentadienyl(tetrahydrofuran) vanadium, chlorocyclopentadienyl(trimethylphosphine) vanadium, and chlorocyclopentadienyl bis(trimethylphosphine) vanadium.

As specific examples of the compound represented by RnMX2-n.La in which n=2, that is, the compound of a periodic table group 5 transition metal of +2 oxidation number, having two cycloalkadienyl groups as the ligand, there can be mentioned biscyclopentadienyl vanadium, bis(methylcyclopentadienyl)vanadium, bis(1,2-dimethylcyclopentadienyl) vanadium, and bis(1,3-dimethylcyclopentadienyl)vanadium.

As specific examples of the compound represented by RnMX3-n.La in which n=1, there can be mentioned cyclopentadienyl vanadium dichloride, methylcyclopentadienyl vanadium dichloride, (1,3-dimethylcyclopentadienyl)vanadium dichloride, and (1-butyl-3-methylcyclopentadienyl)vanadium dichloride. As specific examples of the compound represented by RnMX3-n.La in which n=2, there can be mentioned dicyclopentadienyl vanadium chloride and bis(methylcyclopentadienyl)vanadium chloride.

As specific examples of the compound represented by RMX3, the following compounds can be mentioned.

(i) Cyclopentadienyl vanadium trichloride can be mentioned. There can be mentioned mono-substituted cyclopentadienyl vanadium trichlorides, for example, methylcyclopentadienyl vanadium trichloride, ethylcyclopentadienyl vanadium trichloride, and propylcyclopentadienyl vanadium trichloride.

(ii) There can be mentioned 1,2-di-substituted cyclopentadienyl vanadium trichlorides, for example, (1,2-dimethylcyclopentadienyl)vanadium trichloride, (1-ethyl-2-methylcyclopentadienyl)vanadium trichloride, (1-methyl-2-propylcyclopentadienyl)vanadium trichloride, (1-butyl-2-methylcyclopentadienyl)vanadium trichloride, and (1-methyl-2-(bis (trimethylsilyl)methylcyclopentadienyl)vanadium trichloride.

(iii) There can be mentioned 1,2,3-tri-substituted cyclopentadienyl vanadium trichlorides, for example, (1,2,3-trimethylcyclopentadienyl)vanadium trichloride.

As specific examples of the compound represented by $RM(O)X_2$, there can be mentioned cyclopentadienyl oxovanadium dichloride, and methylcyclopentadienyl oxovanadium dichloride. There can also be mentioned methyl-substituted compounds obtained by substituting the chlorine atom of each of the above compounds with methyl group.

There can be mentioned cyclopentadienyl oxovanadium dimethoxide, cyclopentadienyl oxovanadium di-isopropoxide, cyclopentadienyl oxovanadium di-tert-butoxide, cyclopentadienyl oxovanadium diphenoxide, cyclopentadienyl oxovanadium methoxy chloride, cyclopentadienyl oxovanadium isopropoxy chloride, cyclopentadienyl oxovanadium tert-butoxy chloride, cyclopentadienyl oxovanadium phenoxy chloride, etc. There can also be mentioned methyl-substituted compounds obtained by substituting the chlorine atom of each of the above compounds with methyl group.

As a specific example of the compound represented by RnMX3-n(NR'), cyclopentadienyl(methylimide) vanadium dichloride can be mentioned.

As the non-coordinating anion which constitutes the component (b), i.e. the ionic compound between non-coordinating anion and cation, there can be mentioned, for example, tetra(phenyl)borate, tetra(fluorophenyl)borate, tetrakis(difluorophenyl)borate, tetrakis(trifluorophenyl)borate, tetrakis (tetrafluorophenyl)borate, tetrakis(pentafluorophenyl)borate, and tetrakis(3,5-bistrifluoromethylphenyl) borate.

Meanwhile, as the cation, there can be mentioned carbonium cation, oxonium cation, ammonium cation, phosphonium cation, cycloheptatrienyl cation, transition metal-containing cation such as ferrocenium, etc.

As specific examples of the carbonium cation, there can be mentioned tri-substituted carbonium cations such as triphenyl carbonium cation, tris(substituted phenyl)carbonium cation and the like. As specific examples of the tris(substituted phenyl)carbonium cation, there can be mentioned tri (methylphenyl) carbonium cation, and tris(dimethylphenyl) carbonium cation.

As specific examples of the ammonium cation, there can be mentioned trialkyl ammonium cations such as trimethyl ammonium cation, triethyl ammonium cation, tripropyl ammonium cation, tributyl ammonium cation, tri(n-butyl) ammonium cation and the like; and N,N-dimethyl anilinium cation.

As specific examples of the phosphonium cation, there can be mentioned triaryl phosphonium cations such as triphenyl phosphonium cation, tri(methylphenyl)phosphonium cation, tri(dimethylphenyl)phosphonium cation and the like.

As the ionic compound, there can be preferably used any combination of one of the above-shown non-coordinating anions and one of the above-shown cations.

Preferable as the ionic compound are triphenyl carbonium tetrakis(pentafluorophenyl)borate, triphenyl carbonium tetrakis(fluorophenyl)borate, N,N-dimethyl anilinium tetrakis (pentafluorophenyl)borate, 1,1'-dimethyl ferrocenium tetrakis(pentafluorophenyl)borate, etc.

The ionic compound may be used singly or in combination of two or more kinds.

An aluminoxane may be selected as the component (b). The aluminoxane is obtained by contacting an organic aluminum compound with a condensation agent. There can be mentioned a chain type aluminoxane or a cyclic aluminoxane, both represented by the general formula $(-Al(R')O-)_n$ wherein R' is a hydrocarbon group having 1 to 10 carbon atoms and may be partly substituted with halogen atom and/or alkoxy group, n is a polymerization degree and is 5 or more, preferably 10 or more. As R', there can be mentioned methyl group, ethyl group, propyl group and isobutyl group, with methyl group and ethyl group being preferred. As the organic aluminum compound used as a raw material of the aluminoxane, there can be mentioned, for example, trialkyl aluminums such as trimethyl aluminum, triethyl aluminum, triisobutyl aluminum and the like; and mixtures thereof.

An aluminoxane obtained by using, as a raw material, a mixture of trimethyl aluminum and tributyl aluminum can be used preferably.

With respect to the condensation agent, water can be mentioned as a typical condensation agent. Besides, there can be mentioned any condensation agent with which the trialkyl aluminum can give rise to a condensation reaction, for example, adsorbed water of an inorganic compound and the like, and a diol.

An organic metal compound of a group 1 to 3 element of periodic table may be added as the component (c). There can be mentioned, for example, an organic aluminum compound, an organic lithium compound, an organic magnesium compound, an organic zinc compound, and an organic boron compound.

As specific compounds, there can be mentioned methyl lithium, butyl lithium, phenyl lithium, benzyl lithium, neopentyl lithium, bistrimethylsilylmethyl lithium, dibutyl magnesium, dihexyl magnesium, diethyl zinc, trimethyl aluminum, etc.

The component (c) further includes organic metal halide compounds such as ethyl magnesium chloride, butyl magnesium chloride, dimethyl aluminum chloride, diethyl aluminum chloride, sesquiethyl aluminum chloride, ethyl aluminum dichloride and the like; and organic metal hydride compounds such as diethyl aluminum hydride, sesquiethyl aluminum hydride and the like.

An organic aluminum compound is preferred as the component (c), i.e. the organic metal compound of periodic table group 1 to 3 element. Specific examples of the organic aluminum compound was mentioned above and includes trialkyl aluminums such as trimethyl aluminum, triethyl aluminum, triisobutyl aluminum and the like; organic aluminum halide compounds such as dimethyl aluminum chloride, diethyl aluminum chloride, sesquiethyl aluminum chloride, ethyl aluminum dichloride and the like; and organic aluminum hydride compounds such as diethyl aluminum hydride, sesquiethyl aluminum hydride and the like. The above-mentioned aluminoxane may be used. The above organic metal compound may be used in combination of two or more kinds.

The molar ratio of the component (a), i.e. the metallocene type complex and the component (b), i.e. the ionic compound is preferably 1:0.1 to 1:10, more preferably 1:0.2 to 1:5.

The molar ratio of the component (a), i.e. the metallocene type complex and the component (c), i.e. the organic metal compound is preferably 1:0.1 to 1:1000, more preferably 1:10 to 1:1000, further preferably 1:10 to 1:500.

Preferably, water is added as a component (d) to the above-mentioned catalyst components. The molar ratio of the component (c), i.e. the organic metal compound and the component (d), i.e. water is preferably 0.66:5, more preferably 0.7 to 1.5, further preferably 0.8 to 1.5.

The addition order of the above catalyst components has no particular restriction. However, the addition can be conducted, for example, in the following order. The component (d) is added to a conjugated diene compound monomer to be polymerized or to a mixture of the monomer and a solvent; the component (c) is added; then, the component (a) and the component (b) are added in any desired order. Or, the component (d) and the component (c) are added to a conjugated diene compound monomer to be polymerized or to a mixture of the monomer and a solvent; then, the component (a) and the component (b) are added in any desired order.

Here, the conjugated diene compound monomer to be polymerized may be the total amount or part thereof. In the case of the part of the monomer, the above catalyst mixture can be mixed with the remaining monomer or the remaining monomer solution.

In the first-step polymerization, the molecular weight of resulting polymer is controlled by polymerizing a conjugated diene compound using the above catalyst preferably in the presence of hydrogen.

The amount of the hydrogen present is preferably 500 mmol or less, or 12 liters or less at 20° C. at 1 atm. relative to 1 mol of the conjugated diene; more preferably 50 mmols or less, or 1.2 liters or less at 20° C. at 1 atm., further preferably 0.005 to 20 mmol, or 0.00001 to 0.48 liters at 20° C. at 1 atm. Or, hydrogen may be introduced continuously into the polymerization tank.

The polymerization temperature is preferably −100 to 120° C., particularly preferably −50 to 100° C. The polymerization time is 10 minutes to 12 hours, particularly preferably 30 minutes to 6 hours. In order to further suppress the formation of gel during the polymerization, a known gelation inhibitor may be used.

The use of the second catalyst system allows for production of a polybutadiene having an intrinsic viscosity of 0.1 to 20 as measured at 30° C. in toluene. In this case, a matrix polybutadiene can be produced which has a weight-average molecular weight of 10,000 to 4,000,000 as determined from GPC using a polystyrene as a standard substance and a Mooney viscosity (ML1+4, 100° C., hereinafter abbreviated as ML) of 10 to 130, preferably 15 to 80 and which has substantially no gel content.

As the third catalyst for cis-1,4 polymerization, there can be used a catalyst obtained from (A) an yttrium compound, (B) an ionic compound between non-coordinating anion and cation, and (C) an organic metal compound of an element selected from periodic table group 2, group 12 and group 13 elements.

As the component (A), i.e. the yttrium compound of the above catalyst system, an yttrium salt or an yttrium complex is used preferably. As particularly preferred compounds, there can be mentioned yttrium salts such as yttrium trichloride, yttrium tribromide, yttrium triiodide, yttrium nitrate, yttrium sulfate, yttrium trifluoromethanesulfonate, yttrium acetate, yttrium trifluoroacetate, yttrium malonate, yttrium octylate (ethylhexanoate), yttrium naphthenate, yttrium Versatate, yttrium neodecanoate and the like; alkoxides such as yttrium trimethoxide, yttrium triethoxide, yttrium triisopropoxide, yttrium tributoxide, yttrium triphenoxide and the like; organic yttrium compounds such as trisacetylacetonatoyttrium, tris(hexanedionato)yttrium, tris(heptanedionato)yttrium, tris(dimethylheptanedionato)yttrium, tris(tetramethylheptanedionato)yttrium, trisacetoacetatoyttrium, cyclopentadienyl yttrium dichloride, dicyclopentadienyl yttrium chloride, tricyclopentadienyl yttrium and the like; organic base complexes such as pyridine complex of yttrium salt, picoline complex of yttrium salt and the like; yttrium salt hydrates; alcohol complexes of yttrium salts; etc.

Also, the following yttrium compound can be used.

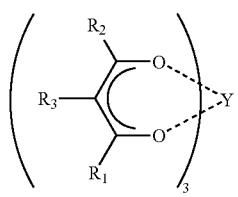

[Formula 2]

(In the above, $R_1$, $R_2$ and $R_3$ are each hydrogen or a hydrocarbon group having 1 to 12 carbon atoms, O is an oxygen atom, and Y is an yttrium atom.)

As specific examples of $R_1$, $R_2$ and $R_3$, there can be mentioned hydrogen, methyl group, ethyl group, vinyl group, n-propyl group, isopropyl group, 1-propenyl group, allyl group, n-butyl group, sec-butyl group, isobutyl group, tert-butyl group, n-pentyl group, 1-methylbutyl group, 2-methylbutyl group, 3-methylbutyl group, 1,1-dimethylpropyl group, 1,2-dimethylpropyl group, 2,2-dimethylpropyl group, hexyl group, heptyl group, octyl group, nonyl group, decyl group, undecyl group, dodecyl group, cyclohexyl group, methylcyclohexyl group, ethylcyclohexyl group, phenyl group, benzyl group, toluoyl group and phenethyl group. There are further included those groups in which any of the above-mentioned groups is substituted, at any position, with hydroxyl group, carboxyl group, carbomethoxy group, carboethoxy group, amide group, amino group, alkoxy group, phenoxy group or the like.

As the yttrium compound, an yttrium salt or an yttrium complex is preferably used. Particularly preferred yttrium compounds are tris(acetylacetonato)yttrium, tris(hexanedionato)yttrium, tris(heptanedionato)yttrium, tris(dimethylheptanedionato)yttrium, tris(trimethylheptanedionato)yttrium, tris(tetramethylheptanedionato)yttrium, tris(pentamethylheptanedionato)yttrium, tris(hexamethylheptanedionato)yttrium, trisacetoacetatoyttrium, etc.

In the component (B), i.e. the ionic compound between non-coordinating anion and cation, of the above catalyst system, there can be mentioned, as the non-coordinating anion, for example, tetra(phenyl)borate, tetra(fluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(3,5-bistrifluoromethylphenyl)borate, tetrakis(tetrafluoromethylphenyl)borate, tetra(toluoyl)borate, tetra(xylyl)borate, triphenyl(pentafluorophenyl)borate, tris(pentafluorophenyl)(phenyl)borate, tridecahydride-7,8-dicarbaundecaborate, tetrafluoroborate, and hexafluorophosphate.

Meanwhile, as the cation, there can be mentioned carbonium cation, oxonium cation, ammonium cation, phosphonium cation, cycloheptatrienyl cation, ferrocenium cation, etc.

As specific examples of the carbonium cation, there can be mentioned tri-substituted carbonium cations such as triphenyl carbonium cation, tri-substituted phenyl carbonium cation and the like. As specific examples of the tri-substituted phenyl carbonium cation, there can be mentioned tri(methylphenyl)carbonium cation, and tri(dimethylphenyl)carbonium cation.

As specific examples of the ammonium cation, there can be mentioned trialkyl ammonium cations such as trimethyl ammonium cation, triethyl ammonium cation, tripropyl ammonium cation, tributyl ammonium cation, tri(n-butyl) ammonium cation and the like; N,N-dialkyl anilinium cations such as N,N-dimethyl anilinium cation, N,N-diethyl anilinium cation, N,N-2,4,6-pentamethyl anilinium cation and the like; and dialkyl ammonium cations such as di(isopropyl)ammonium cation, dicyclohexyl ammonium cation and the like.

As specific examples of the phosphonium cation, there can be mentioned aryl phosphonium cations such as triphenyl phosphonium cation, tetraphenyl phosphonium cation, tri(methylphenyl)phosphonium cation, tetra(methylphenyl)phosphonium cation, tri(dimethylphenyl)phosphonium cation, tetra(dimethylphenyl)phosphonium cation and the like.

As the ionic compound, there can be preferably used any combination of one of the above-shown non-coordinating anions and one of the above-shown cations.

Preferably as the ionic compound are triphenyl carbonium tetrakis(pentafluorophenyl)borate, triphenyl carbonium tetrakis(fluorophenyl)borate, N,N-dimethyl anilinium tetrakis(pentafluorophenyl)borate, 1,1'-dimethyl ferrocenium tetrakis(pentafluorophenyl)borate, etc. The ionic compound may be used singly or in combination of two or more kinds.

An aluminoxane may be selected as the component (B). The aluminoxane is obtained by contacting an organic aluminum compound with a condensation agent. There can be mentioned a chain type aluminoxane and a cyclic aluminoxane, both represented by the general formula $(—Al(R')O—)_n$ wherein R' is a hydrocarbon group having 1 to 10 carbon atoms and may be partly substituted with halogen atom and/or alkoxy group, n is a polymerization degree and is 5 or more, preferably 10 or more. As R', there can be mentioned methyl group, ethyl group, propyl group and isobutyl group with methyl group being preferred. As the organic aluminum compound used as a raw material of the aluminoxane, there can be mentioned, for example, trialkyl aluminums such as trimethyl aluminum, triethyl aluminum, triisobutyl aluminum and the like; and mixtures thereof.

An aluminoxane obtained using, as a raw material, a mixture of trimethyl aluminum and tributyl aluminum can be used preferably.

With respect to the condensation agent, water can be mentioned as a typical condensation agent. Besides, there can be mentioned any condensation agent with which the trialkyl aluminum can give rise to a condensation reaction, for example, adsorbed water of an inorganic compound and the like, and a diol.

As the component (C) of the above catalyst system, i.e. the organic metal compound of a periodic table group 2, 12 or 13 element, there can be used, for example, an organic magnesium, an organic zinc and an organic aluminum. Of these compounds, preferred are dialkyl magnesium, alkyl magnesium chloride, alkyl magnesium bromide, dialkyl zinc, trialkyl aluminum, dialkyl aluminum chloride, dialkyl aluminum bromide, alkyl aluminum sesquichloride, alkyl aluminum sesquibromide, alkyl aluminum dichloride, dialkyl aluminum hydride, etc.

As specific compounds, there can be mentioned alkyl magnesium halides such as methyl magnesium chloride, ethyl magnesium chloride, butyl magnesium chloride, hexyl magnesium chloride, octyl magnesium chloride, ethyl magnesium bromide, butyl magnesium bromide, butyl magnesium iodide, hexyl magnesium iodide and the like.

There can further be mentioned dialkyl magnesiums such as dimethyl magnesium, diethyl magnesium, dibutyl magnesium, dihexyl magnesium, dioctyl magnesium, ethyl butyl magnesium, ethyl hexyl magnesium and the like.

There can further be mentioned dialkyl zincs such as dimethyl zinc, diethyl zinc, diisobutyl zinc, dihexyl zinc, dioctyl zinc, didecyl zinc and the like.

There can further be mentioned trialkyl aluminums such as trimethyl aluminum, triethyl aluminum, triisobutyl aluminum, trihexyl aluminum, trioctyl aluminum, tridecyl aluminum and the like.

There can further be mentioned organic aluminum halide compounds such as dialkyl aluminum chloride such as dimethyl aluminum chloride or diethyl aluminum chloride; ethyl aluminum sesquichloride, ethyl aluminum dichloride and the like; and organic aluminum hydride compounds such as diethyl aluminum hydride, diisobutyl aluminum hydride, ethyl aluminum sesquihydride and the like.

These organic metal compounds of periodic table group 2, 12 or 13 element can be used singly or in combination of two or more kinds.

In the third method, there can be used, as a molecular weight controller for the polybutadiene obtained, a compound selected from (1) hydrogen, (2) a metal hydride compound and (3) an organic metal hydride compound.

As the metal hydride compound (2) used as a molecular weight controller, there can be mentioned lithium hydride, sodium hydride, potassium hydride, magnesium hydride, calcium hydride, borane, aluminum hydride, gallium hydride, germane, lithium boron hydride, sodium boron hydride, lithium aluminum hydride, sodium aluminum hydride, etc.

As the organic metal hydride compound (3) used as a molecular weight controller, there can be mentioned, for example, alkyl boranes such as methyl borane, ethyl borane, propyl borane, butyl borane, phenyl borane and the like; dialkyl boranes such as dimethyl borane, diethyl borane, dipropyl borane, dibutyl borane, diphenyl borane and the like; alkyl aluminum dihydrides such as methyl aluminum dihydride, ethyl aluminum dihydride, propyl aluminum dihydride, butyl aluminum dihydride, phenyl aluminum dihydride and the like; dialkyl aluminum hydrides such as dimethyl aluminum hydride, diethyl aluminum hydride, dipropyl aluminum hydride, dibutyl aluminum hydride, diphenyl aluminum hydride and the like; silanes such as methyl silane, ethyl silane, propyl silane, butyl silane, phenyl silane, dimethyl silane, diethyl silane, dipropyl silane, dibutyl silane, diphenyl silane, trimethyl silane, triethyl silane, tripropyl silane, tributyl silane, triphenyl silane and the like; and germanes such as methyl germane, ethyl germane, propyl germane, butyl germane, phenyl germane, dimethyl germane, diethyl germane, dipropyl germane, dibutyl germane, diphenyl germane, trimethyl germane, triethyl germane, tripropyl germane, tributyl germane, triphenyl germane and the like.

Of these, preferred are diisobutyl aluminum hydride and diethyl aluminum hydride, and particularly preferred is diethyl aluminum hydride.

The addition order of the catalyst components has no particular restriction; however, the addition can be made in the following order.

(1) The component (C) is added in an inert organic solvent in the absence or presence of a butadiene monomer to be polymerized, and the component (A) and the component (B) are added in any desired order.

(2) The component (C) is added in an inert organic solvent in the absence or presence of a butadiene monomer to be polymerized, the above-mentioned molecular weight controller is added, and then the component (A) and the component (B) are added in any desired order.

(3) The component (A) is added in an inert organic solvent in the absence or presence of a butadiene monomer to be polymerized, the component (C) and the above-mentioned molecular weight controller are added in any desired order, and then the component (B) is added.

(4) The component (B) is added in an inert organic solvent in the absence or presence of a butadiene monomer to be polymerized, the component (C) and the above-mentioned molecular weight controller are added in any desired order, and then the component (A) is added.

(5) The component (C) is added in an inert organic solvent in the absence or presence of a butadiene monomer to be polymerized, the component (A) and the component (B) are added in any desired order, and then the above-mentioned molecular weight controller is added.

The individual components may be subjected to aging, before use. In particular, the component (A) and the component (C) are preferred to be subjected to aging.

With respect to the aging conditions, the component (A) and the component (C) are mixed in an inert solvent in the presence or absence of a butadiene monomer to be polymerized. The aging temperature is −50 to 80° C., preferably −10 to 50° C., and the aging time is 0.01 to 24 hours, preferably 0.05 to 5 hours, particularly preferably 0.1 to 1 hour.

In the present invention, the individual catalyst components may be used by being loaded on an inorganic compound or an organic polymer compound.

In the polybutadiene production with the first or second catalyst as well, there can be used a known molecular weight controller, for example, hydrogen, a non-conjugated diene such as cyclooctadiene or allene; or an α-olefin such as ethylene, propylene or butene-1.

In the polybutadiene production with the first catalyst, the polymerization temperature is preferably −30 to 100° C., particularly preferably 30 to 80° C. The polymerization time is preferably 10 minutes to 12 hours, particularly preferably 30 minutes to 6 hours. The polymerization is conducted at normal pressure or at an applied pressure up to about 10 atm. (gauge pressure). Cis-1,4 polymerization is preferably conducted so that the polymer concentration after cis-1,4 polymerization becomes 5 to 26% by weight. With respect to the polymerization tank, a single tank or two- or more-connected tanks are used. The polymerization is conducted by stirring a solution in a polymerization tank (polymerizer). As the polymerization tank, there can be used a polymerization tank with a stirrer for high-viscosity solution, for example, an apparatus described in JP-B-1965-2645.

A known gelation inhibitor may be used in order to further suppress gel formation during the polymerization. The polybutadiene obtained has a cis-1,4-structure content of ordinarily 90% or more, particularly 95% or more, a Mooney viscosity (ML1+4, 100° C., hereinafter abbreviated as ML) of 10 to 130, preferably 15 to 80, and substantially no gel content.

1,3-Butadiene may be added or may not be added to the cis-1,4 polymerization reaction mixture obtained above. Then, syndiotactic-1,2 polymerization is conducted in this polymerization system.

As to the polymerization method with the third catalyst, there is no particular restriction, either. There can be employed bulk polymerization using 1,3-butadiene per se as a polymerization solvent, solution polymerization, etc. As the solvent in the solution polymerization, there can be mentioned aliphatic hydrocarbons such as butane, pentane, hexane, heptane and the like; alicyclic hydrocarbons such as cyclopentane, cyclohexane and the like; aromatic hydrocarbons such as benzene, toluene, xylene, ethylbenzene and the like; olefinic hydrocarbons such as the above-mentioned olefin compounds, cis-2-butene, trans-2-butene and the like; and so forth.

Of them, preferably used are benzene, toluene, cyclohexane, a mixture of cis-2-butene and trans-2-butene, etc.

The polymerization temperature is preferably −30 to 150° C., particularly preferably 30 to 100° C. The polymerization time is preferably 1 minute to 12 hours, particularly preferably 5 minutes to 5 hours.

After the polymerization has been conducted for a given length of time, the inside pressure of the polymerization tank is released as necessary, and post-treatments such as washing, drying and the like are conducted.

As the thus-obtained polybutadiene, there can be mentioned a cis-1,4-polybutadiene having a cis-1,4 structure in an amount of preferably 90% or more, more preferably 92% or more, particularly preferably 96% or more. The [η] of the conjugated diene polymer can be controlled to preferably 0.1 to 10, more preferably 1 to 7, particularly preferably 1.5 to 5.

The cis-1,4 polymerization is preferably conducted so that the polymer concentration after cis-1,4 polymerization becomes 5 to 26% by weight. With respect to the polymerization tank, a single tank or two- or more-connected tanks are used. The polymerization is conducted by stirring a solution in a polymerization tank (polymerizer). As the polymerization tank, there can be used a polymerization tank with a stirrer for high-viscosity solution, for example, an apparatus described in JP-B-1965-2645.

A known gelation inhibitor may be used in order to further suppress gel formation during the polymerization. The polybutadiene obtained has a cis-1,4-structure content of ordinarily 90% or more, particularly 95% or more and a Mooney viscosity (ML) of 10 to 130, preferably 15 to 80, and preferably has substantially no gel content.

As the catalyst for syndiotactic-1,2 polymerization, there is used a catalyst system comprising a trialkyl aluminum compound represented by $R^1_3Al$ (wherein $R^1$ is a hydrocarbon group having 1 to 10 carbon atoms), a sulfur compound and, as necessary, a cobalt compound.

As the sulfur compound, there can be mentioned carbon disulfide, phenyl isothiocyanate, a xanthogenic acid compound, etc. Of them, carbon disulfide is preferred. As the trialkyl aluminum compound represented by $R^1_3Al$ (wherein $R^1$ is a hydrocarbon group having 1 to 10 carbon atoms) and the cobalt compound, there can be mentioned the above-mentioned compounds used in the cis-1,4 polymerization.

The trialkyl aluminum compound is used in an amount of 0.1 mmol or more, particularly 0.5 to 50 mmols or more relative to 1 mol of 1,3-butadiene. The sulfur compound is not restricted particularly but preferably contains no water. The concentration of the sulfur compound is 20 mmols/L or less, particularly preferably 0.01 to 10 mmols/L.

The temperature of 1,2-polymerization of 1,3-butadiene is 0° C. to 100° C., preferably 10 to 100° C., more preferably 20 to 100° C. Into the polymerization system where the 1,2-polymerization is to be conducted, 1,3-butadiene can be added in an amount of 1 to 50 parts by weight, preferably 1 to 20 parts by weight per 100 parts by weight of the cis polymerization mixture, whereby the yield of 1,2-polybutadiene in 1,2-polymerization can be increased. The polymerization time (average residence time) is preferably 10 minutes to 2 hours. The 1,2-polymerization is preferably conducted so that the polymer concentration after 1,2-polymerization becomes 9 to 29% by weight. With respect to the polymerization tank, a single tank or two- or more-connected tanks are used. The polymerization is conducted by stirring a polymerization solution in a polymerization tank (polymerizer). As the polymerization tank used in the 1,2-polymerization, there can be used a polymerization tank with a stirrer for high-viscosity solution, for example, an apparatus described in JP-B-1965-2645, because the solution viscosity becomes higher during the 1,2-polymerization and polymer adhesion tends to occur.

When, in the polymerization reaction, an intended conversion has been achieved, the above-mentioned halogen acid or halogen acid salt is added to terminate the polymerization. The halogen acid or halogen acid salt is added preferably in the form of a solution, particularly an aqueous solution or an alcohol solution such as methanol or ethanol solution. Further, a surfactant may be allowed to be present in order to improve the dispersibility in the polymer solution.

The addition amount of the halogen acid or halogen acid salt is 0.001 mol to 10 mols, preferably 0.002 to 5 mols, more preferably 0.005 to 2 mols, relative to 1 mol of the sulfur compound. The mixing time after the addition is 5 seconds to 1 hour, preferably 10 seconds to 30 minutes, more preferably 20 seconds to 10 minutes.

Further, a known anti-oxidant may be added according to an ordinary method. As the anti-oxidant, there can be mentioned 2,6-di-tert-butyl-p-cresol (BHT) as a phenol type, trinonylphenyl phosphite (TNP) as a phosphorus type, dilauryl-3,3'-thiodipropionate (TPL) as a sulfur type, etc. The anti-oxidant may be used singly or in combination of two or more kinds. The addition amount of the anti-oxidant is 0.001 to 5 parts by weight relative to 100 parts by weight of VCR. Then, a short-stop is added to the polymerization system to stop the polymerization. It is conducted according to a per-se-known method, for example, a method of feeding, after the completion of the polymerization reaction, the polymerization solution into a polymerization termination tank and adding thereto a large amount of a polar solvent such as alcohol, e.g., methanol or ethanol, water or the like, or a method of introducing, into the polymerization solution, an inorganic acid such as hydrochloric acid or sulfuric acid, an organic acid such as acetic acid or benzoic acid, or hydrogen chloride gas. Then, the VCR formed is separated, washed and dried according to ordinary methods.

Incidentally, when, prior to the separation and purification, the halogen acid or halogen acid salt remains in the reaction system, the remaining halogen acid or halogen acid salt is deactivated by contact with an aqueous solution containing a reducing agent such as sulfurous acid, sulfurous acid salt, thiosulfuric acid salt, nitrous acid salt, oxalic acid, oxalic acid salt or the like. Thereby, the VCR obtained can be prevented from oxidation.

The prevention of VCR from oxidation can also be achieved by adding, in order to prevent the oxidation by remaining halogen acid or halogen acid salt, an effective assistant, for example, an assistant (e.g. anti-oxidant) ordinarily added to a rubber composition. As the anti-oxidant, a known anti-oxidant such as hindered phenol or the like can be used.

The thus-obtained VCR is composed of (1) 3 to 30% by weight of a boiling n-hexane-insoluble matter (H.I.) and (2) 97 to 70% by weight of a boiling n-hexane-soluble matter. The boiling n-hexane-soluble matter is a cis-1,4-polybutadiene having 80% or more of a micro structure. The H.I. is an SPBD (syndiotactic-1,2polybutadiene having a melting point of 180 to 215° C. The VCR has an ML of 20 to 150, preferably 25 to 100 at 100° C. In the VCR, the syndiotactic-1,2 polybutadiene is uniformly dispersed in the cis-1,4-polybutadiene matrix as fine crystals. The VCR is low in odor as compared with conventional VCRs.

The VCR obtained by the present invention is compounded singly or by blending with other synthetic rubber or natural rubber, is as necessary extended with a process oil, then is mixed with a filler (e.g. carbon black), a vulcanizing agent, a vulcanization accelerator and other ordinary compounding agents, and is vulcanized. The resulting product is used in rubber applications wherein mechanical properties and abrasion resistance are required, such as tire (e.g. tread, side wall, stiffner, bead filler, inner liner and carcas) and various other industrial products (e.g. hose and belt). The VCR can also be used as a modifier for plastic.

EXAMPLES

In the following Examples and Comparative Examples, each butadiene rubber was measured for the following items as follows.

Reduced Viscosity of n-hexane-insoluble Matter 25 g of a polybutadiene rubber was placed in 1,000 ml of boiling n-hexane and the mixture was subjected to refluxing, whereby the polybutadiene rubber was separated into a boiling n-hexane-soluble matter and a boiling n-hexane-insoluble matter. 0.2 g of the boiling n-hexane-insoluble matter was dissolved in 100 ml of tetralin, and the solution was measured for viscosity at 130° C. using an Ubbellohde viscometer.

Melting Point of n-hexane Insoluble Matter

Measured from an endothermic curve by DSC.

Measurement of Weight-Average Molecular Weight of n-hexane-soluble Matter 25 g of a polybutadiene rubber was placed in 1,000 ml of boiling n-hexane and the mixture was subjected to refluxing. The boiling n-hexane-insoluble matter was separated by filtration to recover a n-hexane solution. From the n-hexane solution was removed n-hexane to recover a n-hexane-soluble matter. The n-hexane-soluble matter was dissolved in tetrahydrofuran. The solution was subjected to GPC to determine a molecular weight in terms of polystyrene, and the Mw of n-hexane-soluble matter was calculated therefrom. The measurement was conducted under the following conditions.

Apparatus: HLC-802A Model (a product of Tosoh Corporation); columns: GMH 6000, two in parallel: elutant: tetrahydrofuran; elutant flow rate: 1.0 ml/min; measurement temperature: column tank 40° C., detector 40° C.; sample concentration: 0.25 g/L; sample injection amount: 0.5 ml Micro-Structure of n-hexane-soluble Matter The boiling n-hexane-soluble matter obtained as above was subjected to infrared spectrometry and the micro-structure of the boiling n-hexane-soluble matter was calculated from the absorption intensity ratio of cis-1,4-structure 740 $cm^{-1}$, trans-1,4-structure 967 $cm^{-1}$ and 1,2-structure (vinyl) 911 $cm^{-1}$.

Toluene Solution Viscosity (T-cp) of n-hexane-soluble Matter

The boiling n-hexane-soluble matter obtained as above was dissolved in toluene in a concentration of 5% by weight. The viscosity of the solution was measured at 25° C. using a Cannon-Fenske viscometer.

Mooney Viscosity of n-hexane-soluble Matter and Compound

Measured in accordance with the method specified in JIS K 6300.

Inspection of Residual Odor

The product obtained was smelled to inspect the degree of the residual odor. Further, since an odor substance is present mainly in the volatile components of the product, the amount of volatile components was employed as an indication for objectively knowing the degree of odor. Therefore, the amount of volatile components was measured under the following conditions. The amount was compared with the level of the odor obtained by organoleptic inspection and the level of residual odor was judged comprehensively. Incidentally, the measurement result of the amount of volatile components was expressed as a relative value when the amount of volatile components obtained in Comparative Example 1 was taken as 100, and is shown in Table 1 which appears later.

2.5 g of the rubber obtained in each Example was weighed accurately in a 20-ml sample bottle and heated at 170° C. for 30 minutes. Then, using 1 ml of the vapor portion in the sample bottle, measurement was conducted using a gas chromatograph provided with a FPD detector, under the following conditions.

FPD gas chromatograph: Agilent 6890 model

Column model: HP-1, 60 m (length)×0.32 mm (inner diameter)×5.0 μm (film thickness)

Column conditions: Keeping at 40° C. for 5 minutes; then, temperature elevation to 250° C. at a rate of 15° C. per minute; lastly, keeping at 250° C. for 11 minutes.

Measurement time: 30 minutes

Example 1

Cis 1,4-Polymerization

The content of a 2.0-L (content volume) autoclave was purged with nitrogen. Thereinto was injected 1 L of a solution (FB) consisting of cyclohexane (350 ml), cis 2-butene (340 ml) and 1,3-butadiene (310 ml), followed by stirring for 30 minutes. Then, 19 mg of carbon disulfide and 26 mg of water ($H_2O$) were added, followed by stirring for 30 minutes for dissolution. Then, diethyl aluminum chloride (DEAC) was added so that the concentration became 2.9 mmols/L. 3 minutes later, 8 mg of dilauryl thiodipropionate and 1.45 ml of cyclooctadiene were added. The mixture was heated to 50° C. Then, 0.6 ml of cobalt octylate [$Co(Oct)_2$] (a toluene solution of 30 mg/ml) was added, and matrix polymerization was conducted at a temperature of 50° C. for 20 minutes.

(Syndiotactc-1,2 Polymerization)

Next, triethyl aluminum (TEA) was added so that the concentration became 3.5 mmols/L, followed by stirring for 5 minutes. Then, 0.6 ml of a toluene solution of cobalt octylate (30 ml/L) was added and polymerization was conducted for 20 minutes.

After the polymerization, 1.26 ml of an aqueous sodium hypochlorite (0.05 mol/L) solution was added to stop the polymerization reaction. Thereafter, the polymerization mixture was treated according to an ordinary method to recover a polybutadiene rubber.

The polybutadiene rubber obtained gave a yield of 95.7 g and showed a Mooney viscosity of 49.4 (ML1+4, 100° C.). The rubber had substantially no odor in an organoleptic test.

The rubber had 13% by weight of a boiling n-hexane-insoluble matter and 87% by weight of a boiling n-hexane-soluble matter. The n-hexane-insoluble mater showed a peak of 201.3° C. in the endothermic curve by DSC.

Example 2

Polymerization was conducted in the same manner as in Example 1 except that the addition amount of the aqueous sodium hypochlorite solution was 3.72 ml. The polybutadiene rubber obtained gave a yield of 99.2 g and showed a Mooney viscosity of 48.9 (ML1+4, 100° C.). The rubber had substantially no odor.

The rubber had 13.5% by weight of a boiling n-hexane-insoluble matter and 86.5% by weight of a boiling n-hexane-soluble matter. The n-hexane-insoluble matter showed a peak of 201.1° C. in the endothermic curve by DSC.

Comparative Example 1

Polymerization was conducted in the same manner as in Example 1 except that, at the time of polymerization stop, water was added in place of the aqueous sodium hypochlorite solution. The polybutadiene rubber obtained gave a yield of 99.7 g and showed a Mooney viscosity of 48.5 (ML1+4, 100° C.) The rubber had an offensive odor.

The rubber had 12.9% by weight of a boiling n-hexane-insoluble matter and 87.1% by weight of a boiling n-hexane-soluble matter. The n-hexane-insoluble matter showed a peak of 201.3° C. in the endothermic curve by DSC.

(Cis 1,4-polymerization)

Example 3

The content of a 1.5-L (content volume) autoclave was purged with nitrogen. Thereinto was fed 700 ml of a mixed solution of 33 wt. % of butadiene, 16 wt. % of cyclohexane and 51 wt. % of 2-butene. Water ($H_2O$) was added at room temperature so that the concentration became 3.7 mmols/L, and carbon disulfide and 1,5-cyclooctadiene were added so that the former's concentration became 30 mg/L and the latter's concentration became 10.2 mmols/L. Vigorous stirring was conducted at 700 rpm for 30 minutes. 2.4 ml of a cyclohexane solution of diethyl aluminum chloride (DEAC) and triethyl aluminum (TEA) [DEAC:TEA=2:1 (molar ratio), Al concentration=1 mol/L] was added, followed by stirring at room temperature for 5 minutes. The mixture was heated to 60° C., and 1.8 ml of a toluene solution of cobalt octylate [$Co(Oct)_2$] (0.005 mol/L) was added. Polymerization was initiated and continued at 70° C. for 15 minutes.

(Syndiotactic-1,2 Polymerization)

Then, 4.2 ml of a cyclohexane solution of triethyl aluminum (TEA) (1 mol/L) were added thereto. Successively, there were added 140 ml of 1,3-butadiene, 36 mg of water, and 1.05 ml of a toluene solution of cobalt octylate [$Co(Oct)_2$] (0.05 mol/L). Polymerization was conducted at 60° C. for 15 minutes.

2 ml of an aqueous sodium hypochlorite (0.2 mol/L) solution was added, followed by stirring for 5 minutes to stop the polymerization reaction. Then, the polymerization mixture was treated according to an ordinary method to recover a polybutadiene rubber.

The polybutadiene rubber obtained gave a yield of 113 g and showed a Mooney viscosity of 72 (ML1+4, 100° C.). The rubber had substantially no odor.

The rubber had 16.6% by weight of a boiling n-hexane-insoluble matter and 83.4% by weight of a boiling n-hexane-soluble matter. The boiling n-hexane-insoluble matter had a reduced viscosity of 1.4 and showed a peak of 201.2° C. in the endothermic curve by DSC. The boiling n-hexane-soluble matter had a Mooney viscosity of 32 (ML1+4, 100° C.), a toluene solution viscosity of 82, a weight-average molecular weight of 400,000, and consisted of 98.5% of a cis-1,4 structure, 0.7% of a trans-1,4 structure and 0.8% of a 1,2-structure.

Example 4

A polybutadiene was synthesized in the same manner as in Example 3 except that a 3 wt. % bleaching powder [(CaCl(OCl)]-suspended water was added at the time of stopping the polymerization. The rubber obtained had substantially no odor.

Example 5

A polybutadiene was synthesized in the same manner as in Example 3 except that a 3 wt. % high test hypochlorite (calcium hypochlorite)-suspended water was added at the time of stopping the polymerization. The rubber obtained had substantially no odor.

Example 6

A polybutadiene was synthesized in the same manner as in Example 3 except that an aqueous 3 wt. % potassium chlorate solution was added at the time of stopping the polymerization. The rubber obtained had substantially no odor.

Comparative Example 2

A polybutadiene was synthesized in the same manner as in Example 3 except that no aqueous sodium hypochlorite solution was added at the time of stopping the polymerization. The rubber obtained had an offensive odor.

Example 7

Aging of Catalyst

There were mixed 5.2 ml of cyclohexane, 1.5 mmols of diisobutyl aluminum hydride (0.75 ml of a cyclohexane solution), 0.31 mmol of butadiene and 0.05 mmol of $NDV_3$ (neodymium Versatate) (a cyclohexane solution). The mixture was subjected to aging at 50° C. for 5 minutes. 0.15 mmol of diethyl aluminum chloride (a cyclohexane solution) was added, followed by aging for 25 minutes.

(Cis 1,4-polymerization)

Into a 2-liter (content volume) autoclave whose content had been purged with nitrogen gas, was fed a butadiene solution consisting of 25 wt. % of 1,3-butadiene and 75 wt. % of cyclohexane. Thereto were added 2.5 mmols of diisobutyl aluminum hydride (1.25 ml of a cyclohexane solution) and the total amount of the aged catalyst solution obtained above. Polymerization was conducted at 60° C. for 30 minutes.

(Syndiotactic-1,2 Polymerization)

To the above-obtained cis polymerization mixture were added 15 mg of carbon disulfide, 3.5 mmols of triethyl aluminum and 35 mg of cobalt octylate. The mixture was stirred at 60° C. for 15 minutes, to subject the remaining 1,3-butadiene to syndiotactic-1,2 polymerization.

2 ml of an aqueous sodium hypochlorite (0.2 mol/L) solution was added, followed by stirring for 5 minutes to stop the polymerization reaction. Then, the polymerization mixture was treated according to an ordinary method to recover a polybutadiene rubber.

The polybutadiene rubber obtained gave a yield of 97 g and showed a Mooney viscosity of 51 (ML1+4, 100° C.). The rubber had substantially no odor.

The rubber had 14% by weight of a boiling n-hexane-insoluble matter and 86% by weight of a boiling n-hexane-soluble matter. The boiling n-hexane-insoluble matter had a reduced viscosity of 1.6 and showed a peak of 202.4° C. in the endothermic curve by DSC. The boiling n-hexane-soluble matter had a Mooney viscosity of 23 (ML1+4, 100° C.), a toluene solution viscosity of 91, a weight-average molecular weight of 600,000, and consisted of 98.2% of a cis-1,4 structure, 0.9% of a trans-1,4 structure and 0.9% of a 1,2-structure.

Comparative Example 3

A polybutadiene was synthesized in the same manner as in Example 7 except that no aqueous sodium hypochlorite solution was added at the time of stopping the polymerization. The rubber obtained had an offensive odor.

Example 8

Cis 1,4-polymerization

The content of a 5.0-L (content volume) autoclave was purged with nitrogen. Thereinto were injected 3 L of a solution (FB) consisting of cyclohexane (900 ml), cis2-butene (1,200 ml) and 1,3-butadiene (900 ml), followed by stirring for 30 minutes. Then, the mixture was measured for water content using a Karl Fischer water tester to obtain an average water content of 10 ppm. The same operation was repeated and 3 liters of the FB was placed in an autoclave. Thereinto was injected 340 ml (a volume at 20° C. at 1 atm.) of hydrogen gas using an integrating mass flow meter. Then, 45 mg of carbon disulfide and 56 mg of water ($H_2O$) were added, followed by stirring for 30 minutes for dissolution. Then, 6 ml of triethyl aluminum (a toluene solution of 1 mmol/L) was added. 3 minutes later, 3 mL of cyclopentadienyl vanadium trichloride ($CpVCl_3$) (a toluene solution of 0.005 mmol/mL) was added, and 12 mL of triphenyl carbenium tetrakis(pentafluorophenyl)borate [$Ph_3CB(C_6F_5)_4$] (a toluene solution of 0.0025 mmol/mL) was added. Matrix polymerization was conducted at 40° C. for 30 minutes.

(Syndiotactic-1,2 Polymerization)

Then, 1.7 ml of cobalt octoate (a toluene solution of 0.1 mmol/ml) was added, followed by polymerization for 30 minutes. After the completion of the polymerization, 2 ml of an aqueous sodium hypochlorite (0.2 mol/L) solution was added to stop the polymerization reaction. Then, stirring was continued for 5 minutes. The polymerization mixture was treated according to an ordinary method to recover a polybutadiene rubber.

The polybutadiene rubber obtained gave a yield of 190 g and showed a Mooney viscosity of 38 (ML1+4, 100° C.) The rubber had substantially no odor.

The rubber had 6% by weight of a boiling n-hexane-insoluble matter and 94% by weight of a boiling n-hexane-soluble matter. The boiling n-hexane-insoluble matter had a reduced viscosity of 1.5 and showed a peak of 204° C. in the endothermic curve by DSC. The boiling n-hexane-soluble matter had a Mooney viscosity of 27 (ML1+4, 100° C.) and a toluene solution viscosity of 84, and consisted of 88.9% of a cis-1,4 structure, 0.8% of a trans-1,4 structure and 10.5% of a 1,2-structure.

Example 9

A polybutadiene was synthesized in the same manner as in Example 8 except that a 3 wt. % bleaching powder [(CaCl(OCl)]-suspended water was added at the time of stopping the polymerization. The rubber obtained had substantially no odor.

Example 10

A polybutadiene was synthesized in the same manner as in Example 8 except that a 3 wt. % high test hypochlorite (calcium hypochlorite)-suspended water was added at the time of stopping the polymerization. The rubber obtained had substantially no odor.

Example 11

A polybutadiene was synthesized in the same manner as in Example 8 except that an aqueous 3 wt. % potassium chlorate solution was added at the time of stopping the polymerization. The rubber obtained had substantially no odor.

Comparative Example 4

A polybutadiene was synthesized in the same manner as in Example 8 except that no aqueous sodium hypochlorite solution was added at the time of stopping the polymerization. The rubber obtained had an offensive odor.

Example 12

Cis 1,4-polymerization

The content of a 2-L (content volume) autoclave was purged with nitrogen. Thereinto was fed a solution consisting of 390 ml of toluene and 210 ml of butadiene. The temperature of the solution was adjusted to 30° C. Then, 0.90 ml of a toluene solution of diethyl aluminum hydride (DEAH) (2 mol/L) was added, followed by stirring at 550 rpm for 3 minutes. Then, 1.8 ml of a toluene solution of tris(2,2,6,6-tetramethylheptane-3,5-dionato) yttrium (20 mmols/L) was added. The mixture was heated to 40° C. Stirring was conducted for 4 minutes. Then, 0.18 ml of a toluene solution of triphenyl carbenium tetrakispentafluorophenyl borate (0.43 mol/L) was added, and polymerization was initiated. Polymerization was conducted at 40° C. for 30 minutes.

(Syndiotactic-1,2 Polymerization)

Then, 1.8 ml of a toluene solution of triethyl aluminum (TEA) (1 mol/L) was added. Successively, water was added so that its content became 0.5 mmol/L. There were added 1.8 ml of a toluene solution of cobalt octylate [Co(Oct)2] (0.05 mol/L) and 0.36 ml of a toluene solution of carbon disulfide (1 mol/L), followed by polymerization at 40° C. for 10 minutes.

2 ml of an aqueous sodium hypochlorite (0.2 mol/L) solution was added, followed by stirring for 5 minutes to stop the polymerization reaction. The polymerization mixture was treated according to an ordinary method to recover a polybutadiene rubber.

The polybutadiene rubber obtained gave a yield of 100 g and showed a Mooney viscosity of 82 (ML1+4, 100° C.). The rubber had substantially no odor.

The rubber had 11.2% by weight of a boiling n-hexane-insoluble matter and 88.8% by weight of a boiling n-hexane-soluble matter. The boiling n-hexane-insoluble matter had a peak of 203.9° C. in the endothermic curve by DSC.

Example 13

A polybutadiene was synthesized in the same manner as in Example 12 except that a 3 wt. % bleaching powder [(CaCl(OCl)]-suspended water was added at the time of stopping the polymerization. The rubber obtained had substantially no odor.

Example 14

A polybutadiene was synthesized in the same manner as in Example 12 except that a 3 wt. % high test hypochlorite (calcium hypochlorite)-suspended water was added at the time of stopping the polymerization. The rubber obtained had substantially no odor.

Example 15

A polybutadiene was synthesized in the same manner as in Example 12 except that an aqueous 3 wt. % potassium chlorate solution was added at the time of stopping the polymerization. The rubber obtained had substantially no odor.

Comparative Example 5

A polybutadiene was synthesized in the same manner as in Example 12 except that no aqueous sodium hypochlorite solution was added at the time of stopping the polymerization. The rubber obtained had an offensive odor.

TABLE 1

| Example or Comparative Example | Amount of volatile components |
|---|---|
| Example 1 | 6 |
| Example 2 | 5 |
| Comparative Example 1 | 100 |
| Example 3 | 4 |
| Example 4 | 8 |
| Example 5 | 5 |
| Example 6 | 9 |
| Comparative Example 2 | 112 |
| Example 7 | 5 |
| Comparative Example 3 | 88 |
| Example 8 | 6 |
| Example 9 | 6 |
| Example 10 | 4 |
| Example 11 | 10 |
| Comparative Example 4 | 93 |
| Example 12 | 3 |
| Example 13 | 5 |
| Example 14 | 3 |
| Example 15 | 8 |
| Comparative Example 5 | 82 |

The measurement results of volatile components, shown in Table 1 agreed well with the results of odor test by olfactory sense.

In the following Examples and Comparative Example, each polybutadiene rubber obtained by adding Irganox 1520 which is known as an anti-oxidant after the stop of polymerization was measured for oxidative deterioration property, and the results are shown. Time to oxidative deterioration time was measured and used as an indication of oxidative deterioration property.

Measurement of Oxidative Deterioration

A polymer placed in a DSC tester was kept at a predetermined temperature in an air atmosphere and measured for a time in which the heat generation appeared owing to the oxidative deterioration of the polymer. A longer time up to the appearance of heat generation indicates that the oxidative deterioration is less likely to occur.

Comparative Example 6

Polymerization was conducted in the same manner as in Comparative Example 1 except that 1,000 ppm of Irganox 1520 (anti-oxidant) was added to a polymer after the stoppage of polymerization. The polybutadiene rubber obtained was measured for oxidative deterioration property at 140° C., 145° C. and 150° C. The results of the measurement are shown in Table 2.

Example 16

Polymerization was conducted in the same manner as in Example 1 except that 1,000 ppm of Irganox 1520 (anti-oxidant) was added to a polymer after the stoppage of polymerization caused by addition of an aqueous sodium hypochlorite solution. The polybutadiene rubber obtained was measured for oxidative deterioration property at 140° C., 145° C. and 150° C. The results of the measurement are shown in Table 2.

Example 17

Polymerization was conducted in the same manner as in Example 16 except that 1,350 ppm of Irganox 1520 was added to a polymer. The polybutadiene rubber obtained was measured for oxidative deterioration property at 140° C., 145° C. and 150° C. The results of the measurement are shown in Table 2.

Example 18

Polymerization was conducted in the same manner as in Example 16 except that 1,700 ppm of Irganox 1520 was added to a polymer. The polybutadiene rubber obtained was measured for oxidative deterioration property at 140° C., 145° C. and 150° C. The results of the measurement are shown in Table 2.

Example 19

Polymerization was conducted in the same manner as in Example 16 except that 2,000 ppm of Irganox 1520 was added to a polymer. The polybutadiene rubber obtained was measured for oxidative deterioration property at 140° C., 145° C. and 150° C. The results of the measurement are shown in Table 2.

TABLE 2

| | Anti-oxidant (ppm) | Time to oxidative deterioration (min) | | |
|---|---|---|---|---|
| | | 140° C. | 145° C. | 150° C. |
| Comparative Example 6 | 1000 | 59.7 | 20.0 | 12.6 |
| Example 16 | 1000 | 48.4 | 15.8 | 7.9 |
| Example 17 | 1350 | 60.3 | 32.1 | 13.2 |
| Example 18 | 1700 | 72.1 | 46.2 | 18.5 |
| Example 19 | 2000 | 81.8 | 59.8 | 22.6 |

The above results revealed the followings. When the addition amount of the anti-oxidant is insufficient as is in Example 16, the oxidation deterioration was about equal to or slightly inferior to that of Comparative Example 6 in which the anti-oxidant was added in the same amount but no aqueous sodium hypochlorite solution was added; however, when a sufficient amount of the anti-oxidant was added as is in Examples 17 to 19, as compared with the case of no addition of sodium hypochlorite, the effect of decomposition prevention was obvious.

INDUSTRIAL APPLICABILITY

The VCR obtained by the present invention is extremely low in odor and, therefore, can be used, per se or by being compounded with other rubber and, as necessary, various additives, in various applications, for example, rubber applications wherein mechanical properties and abrasion resistance are required, such as tire and various other industrial products (e.g. hose and belt). The VCR can also be used as a modifier for plastic. Accordingly, the present invention provides an industrially useful technique.

The invention claimed is:

1. A method for producing a polybutadiene, which comprises firstly subjecting 1,3-butadiene to cis-1,4 polymerization, and subsequently subjecting a resultant in resulting polymerization system to syndiotactic-1,2 polymerization, the method being characterized in that there is added, to terminate the polymerization, a halogen acid or a halogen acid salt, both represented by the following general formula (I):

$$M'(X'O_q)_r Z'_s \qquad (I)$$

(wherein M' is a metal atom or a hydrogen atom; X' is a halogen atom selected from chlorine, bromine and iodine; O is an oxygen atom; q is an integer of 1 to 4; Z' is an anion capable of bonding to M'; r is an integer of 1 or more; and r+s is the oxidation number of M').

2. A method for producing a polybutadiene according to claim 1, wherein X' is chlorine.

3. A method for producing a polybutadiene according to claim 1, wherein the compound represented by the general formula (I) is hypochlorous acid or a hypochlorous acid salt.

4. A method for producing a polybutadiene according to claim 1, wherein a catalyst comprising a cobalt compound, an alkyl aluminum compound and a sulfur compound is used in the syndiotactic-1,2 polymerization.

5. A method for producing a polybutadiene according to claim 1, wherein a catalyst comprising a cobalt compound, an organic aluminum compound and water is used in the cis-1,4 polymerization.

6. A method for producing a polybutadiene according to claim 5, wherein the organic aluminum compound is a trialkyl aluminum compound represented by $R^1_3Al$ (wherein $R^1$ is a hydrocarbon group having 1 to 10 carbon atoms) and a halogen-containing aluminum compound represented by $R^2_{3-n}AlX_n$ (wherein $R^2$ is a hydrocarbon group having 1 to 10 carbon atoms, X is halogen, and n is a number of 1 to 2).

7. A method for producing a polybutadiene according to claim 1, wherein a catalyst obtained by subjecting, to aging, components selected from a compound of group 3 metal of periodic table, an alkyl aluminum hydride compound, butadiene, methyl aluminoxane and a chlorine-containing compound is used in the cis-1,4 polymerization.

8. A method for producing a polybutadiene according to claim 1, wherein a catalyst obtained from a metallocene complex of a transition metal compound, an ionic compound between non-coordinating anion and cation, an organic metal compound of a group 1 to 3 element of periodic table and water [(organic metal compound of group 1 to 3 element of periodic table)/(water)=0.66 to 5 (molar ratio)] is used in the cis-1,4 polymerization.

9. A method for producing a polybutadiene according to claim 1, wherein a catalyst obtained from (A) an yttrium compound, (B) an ionic compound between non-coordinating anion and cation, and (C) an organic metal compound of an element selected from group 2, group 12 and group 13 of periodic table is used in the cis-1,4 polymerization.

10. A method for producing a polybutadiene according to claim 9, wherein there is used, as the yttrium compound (A), an yttrium compound having a bulky ligand, represented by the following general formula:

[formula 1]

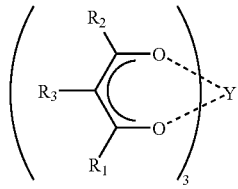

(wherein $R^1$, $R^2$ and $R^3$ are each hydrogen or a hydrocarbon group having 1 to 12 carbon atoms, O is an oxygen atom, and Y is an yttrium atom).

11. A method for producing a polybutadiene according to claim 1, wherein the polybutadiene is a reinforced polybutadiene comprising (1) 3 to 30% by weight of a boiling n-hexane-insoluble matter and (2) 97 to 70% by weight of a boiling n-hexane-soluble matter.

* * * * *